United States Patent
Chen et al.

(10) Patent No.: US 7,695,656 B2
(45) Date of Patent: Apr. 13, 2010

(54) FRICTION HEATING FOR JOINING DISSIMILAR MATERIALS

(75) Inventors: Yen-Lung Chen, Troy, MI (US); Peter H. Foss, Oxford, MI (US); Mark W. Verbrugge, Troy, MI (US); Xiaohong Q. Gayden, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 12/196,850

(22) Filed: Aug. 22, 2008

(65) Prior Publication Data

US 2008/0302474 A1 Dec. 11, 2008

Related U.S. Application Data

(62) Division of application No. 11/466,168, filed on Aug. 22, 2006, now Pat. No. 7,497,917.

(51) Int. Cl.
*B29C 35/00* (2006.01)
*B29C 65/06* (2006.01)
*B32B 37/00* (2006.01)
*C08J 5/00* (2006.01)

(52) U.S. Cl. .................. 264/68; 156/73.5; 156/290; 156/293; 156/308.4

(58) Field of Classification Search ............... 156/73.5, 156/73.6, 153, 196, 212, 213, 214, 219, 220, 156/221, 222, 223, 252, 290, 293, 308.2, 156/308.4, 309.6, 321, 322; 29/505, 521; 264/68, 239, 241, 248, 249, 259, 267, 269, 264/299; 228/2.1, 2.3, 112.1; 428/139
See application file for complete search history.

(56) References Cited

U.S. PATENT DOCUMENTS

| | | | |
|---|---|---|---|
| 272,033 A | 2/1883 | Edge | |
| 2,705,346 A * | 4/1955 | Schlabach et al. | 264/249 |
| 3,308,225 A * | 3/1967 | Wells | 264/249 |
| 3,458,618 A | 7/1969 | Burns et al. | |
| 3,754,319 A | 8/1973 | Miori | |
| 3,899,116 A | 8/1975 | Mims | |
| 3,949,896 A | 4/1976 | Luc | |
| 4,106,962 A | 8/1978 | Adams et al. | |
| 4,144,110 A | 3/1979 | Luc | |
| 4,427,471 A * | 1/1984 | Chierici | 156/73.5 |
| 4,532,166 A * | 7/1985 | Thomsen et al. | 428/57 |
| 4,547,239 A * | 10/1985 | Carlson | 156/73.5 |
| 4,822,671 A | 4/1989 | Carper et al. | |
| 4,865,680 A | 9/1989 | Pierson | |
| 5,538,680 A * | 7/1996 | Enders | 264/516 |
| 2004/0247828 A1 | 12/2004 | Brozenick et al. | |

FOREIGN PATENT DOCUMENTS

JP 57123020 A * 7/1982
JP 61079622 A * 4/1986

OTHER PUBLICATIONS

"Induction heating." 2009. Encyclopædia Britannica. Retrieved Apr. 23, 2009, from Encyclopædia Britannica Online: http://www.search.eb.com/eb/article-9042356.*

* cited by examiner

*Primary Examiner*—Richard Crispino
*Assistant Examiner*—Brian R Slawski
(74) *Attorney, Agent, or Firm*—Reising Ethington P.C.

(57) ABSTRACT

One side of a metal sheet is joined to a polymer layer by applying heat to a joining area on the opposite side of the metal. The heat flows through the thin metal to activate a thermoplastic material or heat setting polymer into a bond with the metal. The method can be used to bond the metal sheet to a plastic body or another metal member. It is preferred to use a friction or friction stir tool to heat the metal surface.

20 Claims, 2 Drawing Sheets

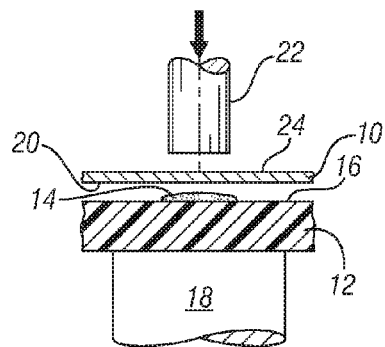
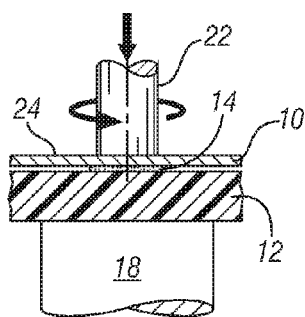
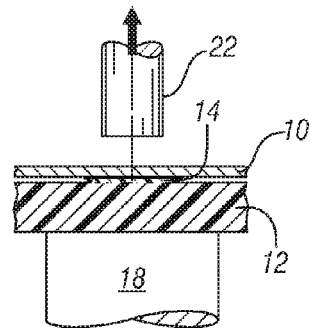
*FIG. 1A*  *FIG. 1B*  *FIG. 1C*
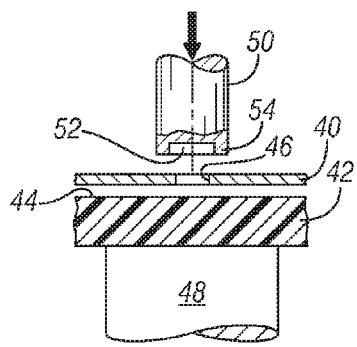
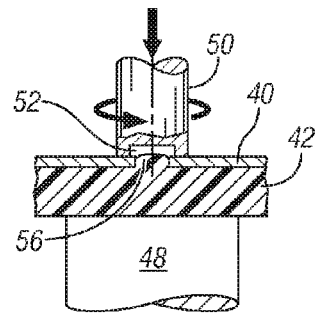
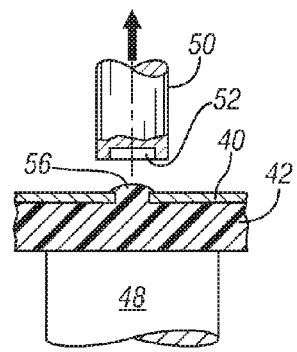
*FIG. 2A*  *FIG. 2B*  *FIG. 2C*
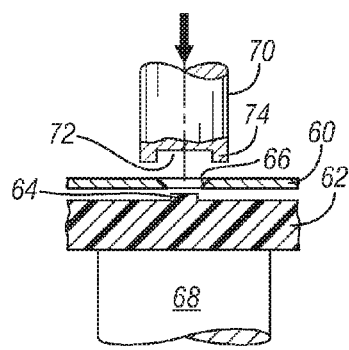
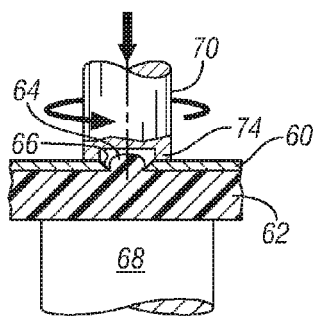
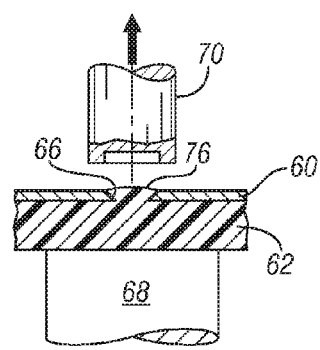
*FIG. 3A*  *FIG. 3B*  *FIG. 3C*

FRICTION HEATING FOR JOINING DISSIMILAR MATERIALS

This application is a divisional of U.S. patent application Ser. No. 11/466,168 filed on Aug. 22, 2006, titled "Friction Heating for Joining Dissimilar Materials", and which is incorporated herein by reference.

TECHNICAL FIELD

This invention pertains to the use of localized surface heating to bond dissimilar materials. More specifically, this invention pertains to use of localized frictional heating on one side of a sheet of metal to promote bonding of a polymeric material to the other side of the metal sheet.

BACKGROUND OF THE INVENTION

Automotive body panels and other multiple-layer manufactured articles could be made lighter if an efficient method could be devised for bonding a metal sheet to a polymeric surface. For example, the weight of body panels could be reduced if a relatively light weight metal or polymer panel could be easily attached to a heavier metal panel. The light weight panel could be of a different metal alloy or of a thermoplastic or thermoset polymer material. There is a need to join dissimilar materials in many manufactured products to provide design flexibility and improved material usage.

SUMMARY OF THE INVENTION

In a first embodiment of the invention, one side of a sheet metal member is pressed against a polymeric surface that can be adhesively bonded to the sheet metal by short duration application of heat at one or more selected locations on the exposed side of the metal sheet. The locally applied heat flows through the relatively thin, thermally conductive sheet metal layer to promote adhesion (and/or a mechanical bond) with the underlying polymeric material. The adhesive bond may be formed by momentary thermal softening of a thermoplastic polymer or thermoplastic polymer adhesive composition or by thermal activation of a thermosettable polymer adhesive composition. In the momentary application of localized intense heat to a relatively thin metal sheet (e.g. about 0.4 to 4 millimeters thick) the heat is rapidly conducted through the sheet for softening or activating the underlying polymeric material before the region cools by heat loss to the surrounding materials.

This method may be used to attach a metal sheet member to a thermoplastic polymer body that can be locally softened to form an adhesive bond at each heated location on the adjoining sheet member. Or the method may be used with a suitable interposed adhesive layer to bond the metal sheet to another metal body or to a heat resisting polymer body. The heat activation through the metal layer may be applied in selected spots or along selected line patterns or in other heating patterns to form bonding between the metal sheet or panel and the other member. The bonding may be conducted to achieve final attachments between the metal and polymer for the making of a part, or the bonding may be intended to temporarily hold the metal to another member until a more co-extensive bond to the metal sheet or panel is achieved in a subsequent joining operation.

The surface of the metal sheet facing the polymer body may be suitably roughened to provide additional surface area for the bonding.

There are many available heating practices that could be adapted for localized area heating of a metal sheet member in the practice of this invention. These include the use of torches (as in welding), laser beams, shaped induction heating coils, heated metal rods, or the like. Heating with a friction tool, especially a friction stir tool, is a practical and preferred method of providing localized heat to the metal surface.

As adapted for use in the process, the end of a rotating metal or ceramic rod (or an oscillating or vibrating tool) is pressed against the outer surface of the metal sheet. The rod is made of a strong and heat resistant metal alloy or ceramic material and is usually not otherwise heated. The end of the tool is sized and shaped to heat a predetermined area of the metal workpiece. The rotating rod is pressed in selected spots on the metal sheet for a brief time (for example, a few seconds or so) to suitably heat that location of the sheet. The rotating tool can be advanced and retracted from spot to spot or moved in a linear engagement pattern over the sheet to heat selected patterns on the side of the sheet. Several friction or friction stir heating tools can be used in combination to simultaneously heat several predetermined local areas of the sheet for achieving heat induced adhesive bonds to the opposite side of the sheet member. Friction or friction stir heating is clean, simple and efficient and preferred for the practice of this invention.

In another embodiment of the invention, a mechanical bond is formed between a thermoplastic polymer body, for example a sheet, that is pressed against the metal sheet member. A hole (or series of holes) of suitable shape is formed in the metal sheet and the contacting surface of the heating tool is sized and shaped to cover the hole and heat the metal around the hole. The friction heating tool is pressed over the hole and rotated to heat the surrounding metal. The heated metal softens the underlying thermoplastic material and it flows into the hole (and optionally through it). To account for the movement of polymer material through the hole, the polymer substrate can be constructed with slight elevations for the regions where the bonds are to be made. The flow of hot plastic can be accommodated by a recess in the end of the rotating tool and/or by chamfering or otherwise shaping the sides (e.g., a threaded hole or the like) or opening of the hole. After the tool is removed from engagement with the metal, the bonding area rapidly dissipates heat to the surrounding metal and the displaced thermoplastic re-solidifies to grip the metal in a mechanical bond. Of course many such bonds can be formed as needed, simultaneously or sequentially, between a thermoplastic body and a metal sheet or panel member.

Other objects and advantages of the invention will become apparent from a detailed description of preferred embodiments of the invention which follows.

BRIEF DESCRIPTION OF THE DRAWINGS

FIGS. 1A-1C illustrate a sequence of steps in which a local adhesive bond is formed between a metal panel overlying a plastic panel. Each of the figures is a schematic cross-sectional view of a fragment of a metal panel pressed against a polymer panel with an interposed layer of heat activatable adhesive. In the process the outer side of the metal panel is heated by a rotating friction or friction stir heat tool.

FIGS. 2A-2C illustrate a sequence of steps in which a local interlocking mechanical bond is formed between a metal panel overlying a plastic panel. Each of the figures is a schematic cross-sectional view of a fragment of a metal panel pressed against a fragment of a thermoplastic polymer panel. The metal panel has a hole for receiving thermoplastic material from the polymer panel. The outer side of the metal sheet is heated by a rotating friction heat tool that has a recess to accommodate the upward flow of thermoplastic.

FIGS. 3A-3C present a sequence of steps, of a variation in the FIGS. 2A-2C embodiment, in which a local interlocking mechanical bond is formed between a metal panel overlying a plastic panel. Each figure is a schematic cross-sectional view of a fragment of a metal panel pressed against a thermoplastic polymer panel. In this embodiment a chamfered hole is formed in the metal panel for receiving extruded thermoplastic material from the plastic panel and from a boss on the plastic panel.

DESCRIPTION OF PREFERRED EMBODIMENTS

Figure 4:
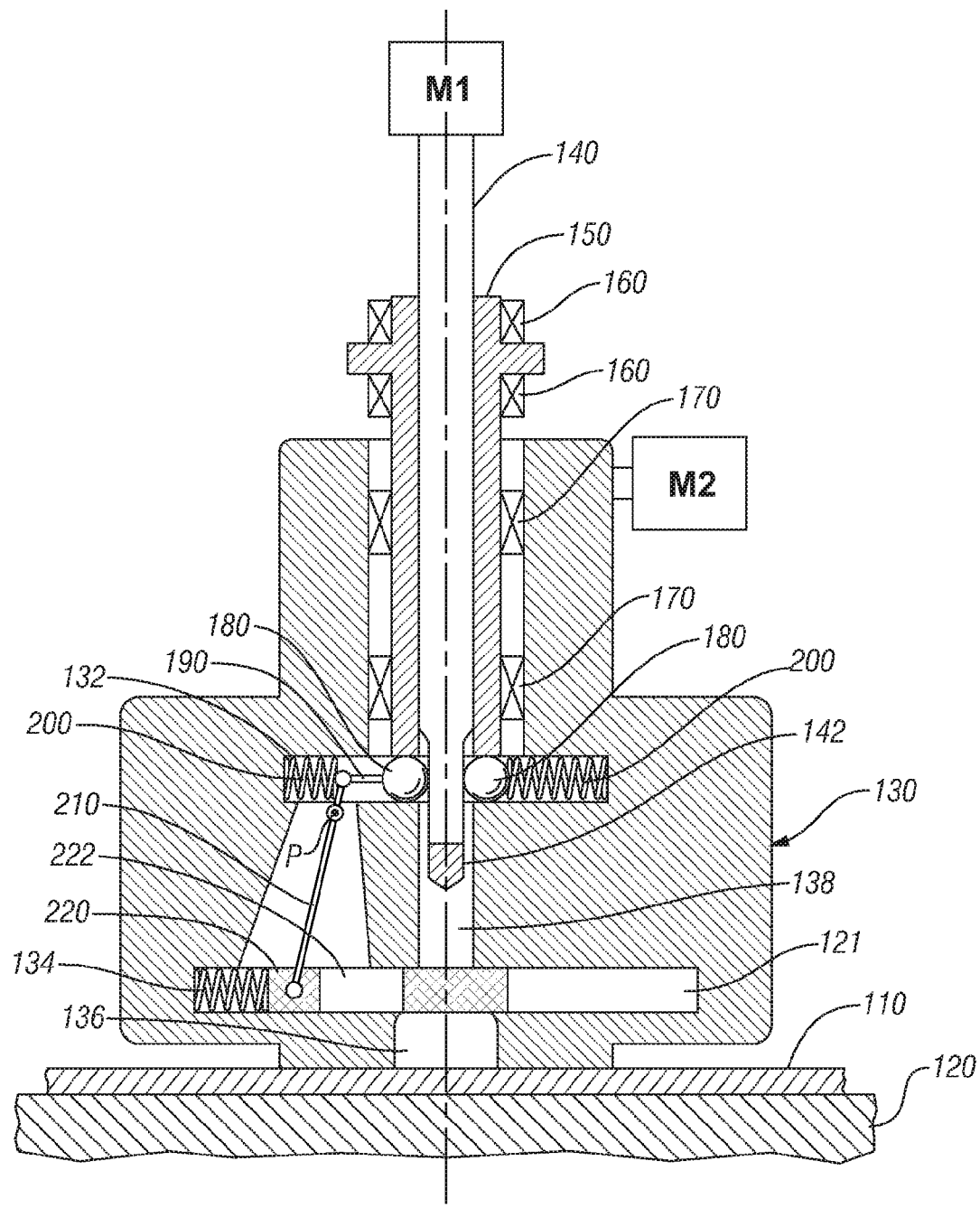
FIG. 4 is a side view in cross-section of a combination drill and friction heating tool pressed against a metal panel for a practice of this invention.

In one embodiment of the invention, a sheet metal panel is joined with an adhesive at selected locations to a plastic panel. For example, an aluminum panel is joined to thermoplastic panel or to a polymer composite panel with an interposed adhesive interlayer. The adhesive layer may be coextensive with the overlapping portions of the sheets or, as illustrated in the following text, the adhesive may be placed at specific bonding locations.

An aluminum alloy sheet that may, for example, be a previously formed inner or outer deck lid panel for a passenger car that is to be joined with a series of adhesive spot bonds to a complementary previously formed polymer composite panel. FIGS. 1A-1C illustrate only small portions of an aluminum alloy panel 10 and of a polymer composite panel 12 at a region where a single adhesive bond is to be formed between them in accordance with this invention.

In FIG. 1A composite panel 12 is supported on a suitable base or fixture 18. A portion of heat activatable adhesive 14 has been placed at a location on the upper surface 16 of polymer composite panel 12. Metal panel 10 is being placed with its bonding side 20 facing side 16 of polymer composite panel 12 and adhesive portion 14. The working end of a suitable friction or friction stir heating tool 22 (hereinafter referred to as friction heating tool 22) is poised above the upper or exposed surface 24 surface of metal panel 10. In this embodiment, friction heating tool 22 is used to apply the heat for the joining operation. The heating tool 22 is motor driven and carried on a suitable machine arm such as a robot arm.

In FIG. 1B, friction heating tool 22 has started to rotate and is pressing against the upper surface 24 of metal panel 10 to heat the panel and adhesive portion 14. In FIG. 1B, adhesive portion 14 is now compacted as a layer between metal panel 10 and polymer composite panel 12 and the localized heat activation of adhesive 14 is being completed. The motor-driven rotating friction heating tool 22 is pressed onto the upper surface 24 of aluminum panel 10 with an appropriate amount of force for a pre-determined duration to generate an appropriate amount of heat to melt the adhesive film 14 and join the two work pieces 10, 12. As seen in FIG. 1C, the friction heating tool 22 is then retracted from metal panel 10 for a subsequent localized heat bonding operation on the same set of panels 10, 12 or on a different set of workpieces.

In the example illustrated schematically in FIGS. 1A-1C a single adhesive spot joint was formed with the understanding that many such spot bonds would be formed sequentially or simultaneously as necessary between large facing panels or other workpieces. However, the adhesive can be applied in linear patterns or over two-dimensional areas between the facing metal sheet and facing workpiece and the friction or friction stir heating tool moved over the non-binding surface of the metal workpiece to activate the adhesive material. In another embodiment, an adhesive layer is formed coextensively between the facing surfaces of the workpieces. Here temporary bonding of the panels may be achieved by localized heating of the metal layer and the two layers are then placed in an oven to complete the full bond between the layers.

In another embodiment of the invention, the heat for bonding the aluminum panel 10 and polymer composite panel 12 could be supplied by using a hollow stainless steel rod, with resistive heating elements enclosed inside, whose temperature is controlled within an appropriate range for quickly melting the adhesive film 14 and thereby bonding the work pieces when the hot end of the stainless steel rod is pressed onto the aluminum panel. Other sources of rapid heat supply include: a TIG (tungsten inert gas) welding torch, plasma arc welding torch, an electron beam heating apparatus, a laser beam heating apparatus, a suitable shaped induction coil, an oxygen-fuel flame heating system, or the like.

In the above example the metal sheet was attached to a polymer body or sheet using an interposed adhesive. A like practice can be used to bond similar and dissimilar metal sheets with an intervening polymeric adhesive layer. The intervening adhesive layer provides the means of attaching metal sheets of different composition and can provide a corrosion resistant barrier between them.

In another embodiment of the invention, a metal panel or sheet is mechanically attached to a thermoplastic body with or without the use of an interposed adhesive. In this embodiment the metal panel has pre-formed holes for receiving thermoplastic material from the plastic body which is extruded into the hole during localized heating of the exposed surface of the metal sheet. FIGS. 2A-2C illustrate a series of steps to form such a bond between a metal sheet and a thermoplastic sheet. Only the bonding regions of the facing workpieces are shown in FIGS. 2A-2C.

In the cross-sectional view of FIG. 2A, a metal panel 40 is placed face-to-face over a thermoplastic sheet or panel 42 which is supported on fixture 48. The metal panel may be of any suitable metal alloy, but is likely to be an alloy of steel or aluminum or magnesium in automotive applications. The thermoplastic panel may be of any desired and suitable thermoplastic composition.

In this embodiment, the metal sheet or panel 40 has a pre-drilled hole 46 at the intended joining region. A rotatable friction heating tool 50 is brought to a position directly over pre-drilled hole 46. The locations of the joining holes, like hole 46, in the metal sheet are indexed and the movement of the friction heating tool 50 is controlled by a programmable mechanism or by a robot so that the axis of the tool 50 and that of hole 46 are aligned. In this embodiment friction joining tool 50 has a round recess or pocket 52 in tool end 54 that presses and rotates against the metal of sheet 40 surrounding hole 46. The diameter of the pocket 52 is larger than that of the hole 46 in the metal panel 40.

Referring to FIG. 2B, friction heating tool 50 is then rotated and lowered, and the annular portion of tool end 54 around pocket 52 is pressed against the upper surface of metal panel 40 around hole 46. With an appropriate control of tool rotating speed and pressing force, the frictional heat generated at the interface of the tool and metal sheet is sufficiently high to melt a portion of the thermoplastic sheet 42 underlying hole 46 such that a pool of melted plastic 56 in sheet 42 flows through the hole 46 in the metal panel 40, enters the pocket 52 at the end 54 of the tool 50.

FIG. 2C illustrates the completion of the mechanical bond forming sequence. The rotation of tool 50 may be stopped (depending on production cycle time requirements) and the tool is retracted from the present joining site for advancement to another joining site. The extruded thermoplastic material 56 cools and forms a button 56 with a head overlapping metal panel 40 to mechanically join it to thermoplastic sheet 42. Often several such attachments will be formed between a metal sheet 40 and a thermoplastic sheet 42 and tool 50 is moved to make a subsequent attachment.

In the embodiment of the invention illustrated in FIGS. 2A-2C, the hole 46 in the metal panel 40 is a straight-through round hole which is preferred for many joining situations. But the joining hole does not have to be round, nor does it necessarily require straight-through (or cylindrical) side walls. The side wall of the hole may be threaded to provide a better mechanical locking effect. There may be applications of the joining process of this invention in which, for example, square holes or elliptical holes may provide a better joint. Similarly, chamfered wall holes may provide a mechanical joint with less protrusion of the thermoplastic above the surface of the metal layer.

FIGS. 3A-3C illustrate a variation on the joining process illustrated in FIGS. 2A-2C. FIGS. 3A-3C, like FIGS. 2A-2C, illustrate in cross-section only a portion of a larger metal sheet or panel 60 and a thermoplastic sheet 62. But in the practice of FIGS. 3A-3C, a chamfered round hole 66 is formed in the metal panel 60. And thermoplastic sheet 62 has a preformed boss or plateau 64 of material on its joining surface to supply thermoplastic material for the joining operation. Chamfered hole 66 has a smaller diameter at the bottom surface of metal panel 60 intended to lie against thermoplastic sheet 62 and a larger diameter at the upper surface of metal panel 60. The shape of hole 66 permits molten thermoplastic material from thermoplastic sheet plateau 64 to expand outwardly in metal sheet chamfered hole 66 to secure the panels 60, 62 without as much plastic material extending above metal panel 60.

In FIG. 3A metal sheet 60 is positioned on thermoplastic sheet 62 with chamfered hole 66 aligned with thermoplastic sheet plateau 64. Thermoplastic sheet 62 is supported on fixture 68. The friction heating tool 70 is poised above chamfered hole 66 of metal sheet 60. Friction heating tool 70 may have a pocket 72 formed in its metal sheet contacting end 74. The tool end 74 is an annular surface adapted to contact the top surface of metal sheet 60 on the metal surrounding chamfered hole 66.

In FIG. 3B friction heating tool 70 is rotating with annular tool end 74 in heat generating frictional contact with metal sheet 60. Heat flows through sheet 60 to underlying thermoplastic sheet 62 heating it and melting a pool of its material in the region of plateau 64. Molten plastic from sheet 62 flows into and through chamfered hole 66 and into pocket 72 in the end of tool 70. In FIG. 3C the tool 70 has been retracted from the joining site for advancement to another task. Thermoplastic material from sheet 62 has solidified in the chamfered hole 66 as a locking member portion 76 of sheet 62 to bond metal sheet 60 to thermoplastic sheet 62.

The joining practices illustrated in FIGS. 2A-2C and 3A-3C do not have to have pre-formed holes in the metal layer. In an embodiment of the invention illustrated in FIG. 4 a drilling tool and friction heating tool can be combined in a single machine. First, friction heating tool 130 is lowered to apply pressure onto metal panel 110 and thermoplastic panel 120 such that there is no gap between them. Secondly, drill 140 is lowered along the keyways (not shown) on the inside wall of tubular housing 150. When the top portion of the drill shank (with a larger diameter) is passing between two steel balls 180, the steel balls are pushed into slot 132 within friction heating tool 130. The pushrod 190 attached to the steel ball on the left side will in turn swing lever 210 around pivot P and push sliding gate 220 in slot 121 to the right such that hole 222 in sliding gate 220 is aligned with holes 136 and 138 in friction heating tool 130. Spring 134 assists lever 210 in moving sliding gate 220.

Drill 140 being rotated by motor M1 continues to come down and drill a hole in metal panel 110 and slightly into thermoplastic panel 120 such that a cylindrical hole or a countersunk hole in the metal panel is obtained. Then drill 140 is raised back up into hole 138 in friction heating tool 130 to such a position that only the lower portion (with a smaller diameter) of the drill shank, not the cutting tip portion 142, is in contact with steel balls 180. When the lower portion of drill shank with a smaller diameter is passing between steel balls 180, these two steel balls are pushed out within slot 132 by springs 200 toward the drill shank. Meanwhile, pushrod 190 swings lever 210 around pivot P to pull sliding gate 220 in slot 121 to the left such that holes 136 and 138 within friction heating tool 130 are separated by the sliding gate as is shown in FIG. 4.

The entire assembly in FIG. 4 is then raised up with a sufficient gap such that the compressed air from a nozzle (not shown) can blow away the metal and plastic chips that were produced during the drilling operation. Friction heating tool 130 is then rotated by motor M2, lowered and pressed onto metal panel 110 to produce sufficient heat to melt the thermoplastic directly underneath, such that the amount of thermoplastic material melted is sufficient to flow through the hole drilled in metal panel 110 and fill hole 136 to produce a plastic button when cooled. Metal panel 110 and thermoplastic panel 120 are thus locked mechanically. Bearings 160 are mounted on a sub-frame and hold tubular housing 150 in place. Bearings 170 are mounted in between tubular housing 150 and friction heating tool 130 to allow them to rotate independently.

The friction heating tool may be cooled by air jets (not shown) if necessary. Drill 140 may be replaced by a thread-forming tool to produce threaded holes; however, motor M1 needs to reverse its rotational direction on the retracting stroke of the thread-forming tool.

The practice of the invention has been illustrated with certain preferred embodiments but the scope of the invention is not limited to such examples.

The invention claimed is:

1. A method of attaching a thermoplastic polymer body in a predetermined region to one side of a metal sheet, the method comprising:

forming a hole through the metal sheet at the predetermined region;

placing the thermoplastic polymer body against the one side of the metal sheet covering the hole in the metal sheet;

heating the opposite side of the metal sheet at the predetermined region opposite the thermoplastic polymer body by pressing an end of a rotating tool in frictional engagement with the metal sheet surrounding the hole, heat being conducted through the metal sheet to the predetermined region of the thermoplastic polymer body to heat soften a portion of the thermoplastic polymer body to form heat softened thermoplastic material; then urging the heat softened thermoplastic material into the hole and into mechanical engagement with the metal sheet; and stopping the heating to cool the heat softened thermoplastic material and form a mechanical attachment between the metal sheet and the thermoplastic polymer body.

2. A method as recited in claim 1 in which the hole is round.

3. A method as recited in claim 1 in which the hole is chamfered to widen in the direction from the one side of the metal sheet to the opposite side.

4. A method as recited in claim 1 in which the inside surface of the hole is threaded.

5. A method as recited in claim 1 in which the end of the tool has a pocket for receiving the softened thermoplastic material flowing through the hole in the metal sheet and for shaping the thermoplastic material into contact with the metal sheet.

6. A method as recited in claim 5 in which the diameter of the pocket is greater than the diameter of the hole.

7. A method as recited in claim 5 in which the thermoplastic material received in the pocket forms a button over the metal sheet upon cooling.

8. A method as recited in claim 1 in which the tool is a rotating rod.

9. A method as recited in claim 8 in which the rod is made of one of a metal alloy or a ceramic material.

10. A method as recited in claim 1 in which the tool is one of an oscillating tool or a vibrating tool.

11. A method as recited in claim 1 in which the thermoplastic polymer body is a thermoplastic polymer sheet.

12. A method as recited in claim 1 in which the thermoplastic polymer body has a preformed plateau on the side of the thermoplastic polymer body facing the metal sheet to supply the heat softened portion of the thermoplastic polymer body to expand into the hole.

13. A method as recited in claim 1 in which upon cooling, the heat softened thermoplastic material re-solidifies and forms the mechanical attachment between the metal sheet and the thermoplastic body by gripping the metal sheet.

14. A method as recited in claim 1 further comprising supporting the thermoplastic polymer body on a fixture.

15. A method as recited in claim 1 further comprising simultaneously forming a hole through the metal sheet at a plurality of predetermined regions, and heating the opposite side of the metal sheet at the plurality of predetermined regions to form the mechanical attachment between the metal sheet and the thermoplastic polymer body at the plurality of predetermined regions.

16. A method as recited in claim 1 further comprising sequentially forming a hole through the metal sheet at each of a plurality of predetermined regions, and heating the opposite side of the metal sheet at each of the plurality of predetermined regions to obtain mechanical attachment between the metal sheet and the thermoplastic polymer body at the plurality of predetermined regions.

17. A method of attaching an automotive thermoplastic polymer panel in a predetermined region to one side of an automotive metal panel, the method comprising:

forming a hole through the automotive metal panel at the predetermined region;

placing the automotive thermoplastic polymer panel against the one side of the automotive metal panel covering the hole in the metal panel;

heating the opposite side of the automotive metal panel at the predetermined region opposite the automotive thermoplastic polymer panel by pressing an end of a rotating tool in frictional engagement with the automotive metal panel surrounding the hole, heat being conducted through the metal panel to the predetermined region of the thermoplastic polymer panel to heat soften a portion of the thermoplastic polymer panel to form heat softened thermoplastic material; then urging the heat softened thermoplastic material into the hole and into mechanical engagement with the automotive metal panel; and stopping the heating to cool the heat softened thermoplastic material and form a mechanical attachment between the automotive metal panel and the automotive thermoplastic polymer panel.

18. A method as recited in claim 17 in which the end of the tool has a pocket for receiving the softened thermoplastic material flowing through the hole in the automotive metal panel and for shaping the thermoplastic material into contact with the automotive metal panel.

19. A method as recited in claim 18 in which the diameter of the pocket is greater than the diameter of the hole.

20. A method as recited in claim 18 in which the thermoplastic material received in the pocket forms a button over the metal sheet upon cooling.

* * * * *